G. M. PHELPS.

Improvement in Galvanic-Batteries.

No. 130,593.

Patented Aug. 20, 1872.

UNITED STATES PATENT OFFICE.

GEORGE M. PHELPS, OF BROOKLYN, NEW YORK, ASSIGNOR TO WESTERN UNION TELEGRAPH COMPANY.

IMPROVEMENT IN GALVANIC-BATTERIES.

Specification forming part of Letters Patent No. 130,593, dated August 20, 1872.

Specification describing an Improvement in Galvanic-Batteries, invented by GEORGE M. PHELPS, of Brooklyn, in the county of Kings and State of New York.

This invention relates to that class of batteries in which the copper or negative metal is near the bottom of the cell and the zinc or positive metal is suspended in the solution. Batteries of this general character being known, I remark that my improvement relates to the construction of the zinc pole of the battery and the mode of suspending the same adjustably, to vary the distance between the positive and negative poles, and regulate the power of the battery.

Figure 2:
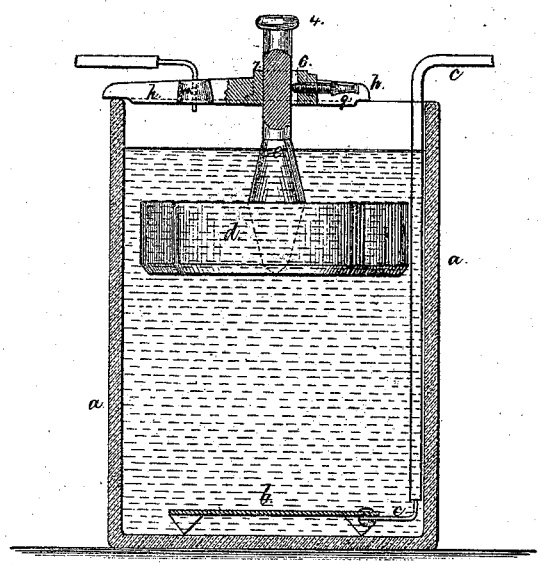
Figure 1:
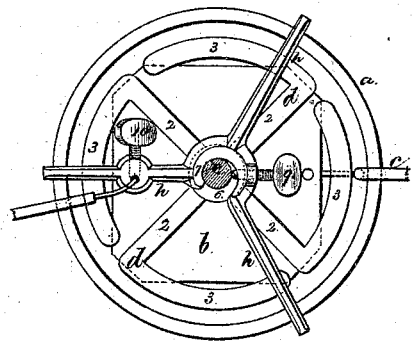

In the drawing, Figure 1 is a plan of the battery-cell or cup, with the stem of the zinc pole in section, and Fig. 2 is a vertical section of the cell complete.

The cell is made of a glass or other suitable vessel, $a$, and the negative plate of copper, $b$, forming the positive-pole of the battery, is made in the usual manner with a copper wire, $c$, attached upon one side or edge, said wire being insulated and passing up through the liquid in the cell and to the next cell in the battery or otherwise, as now usual. The zinc $d$ is made of a series of arms, 2, standing radially, with segments of rings, 3, upon their ends. In this manner a large extent of surface is obtained, and there is not any risk of the metal breaking in casting from unequal contraction. The stem $e$ of this zinc pole $d$ is also cast with the other parts, and it is made with a head, 4, above the supporting-arms $h$, so that in case the adjusting-screw should be loosened or cease to hold the same firmly the mass of metal will not fall into the cell, as is frequently the case with batteries of this class, and often the glass vessel is broken. To allow for introducing the stem $e$ the eye of the supporting-arms $h$ is made with an opening, 6, at one side, but this is not in the form that would be produced by two parallel tangents, but the eye is made as a hook, 7, at the side opposite to the clamping-screw 9, as seen in Fig. 1, so that the stem cannot slip out of the eye sidewise when the said screw 9 is loosened sufficiently to allow for raising or lowering the pole $d$, but when the stem and arms are to be separated the screw 9 has to be loosened sufficiently to allow of the stem being drawn back out of the hook 7. The binding-screw 10 secures the wire of the adjacent cell or one of the battery wires.

I claim as my invention—

1. The zinc pole, made of the radial arms 2 and ring segments 3 upon the ends of such arms, as and for the purposes set forth.

2. The stem $e$ of the zinc pole, made with a head on it, in combination with the arms $h$, open eye 6, and clamping-screw 9, as and for the purposes set forth.

3. The hook 7, in the open eye of the supporting-arms $h$, and clamping-screw 9, in combination with the pole $d$ and its stem $e$, as and for the purposes set forth.

Signed by me this 8th day of July, A. D. 1872.

GEO. M. PHELPS.

Witnesses:
GEO. T. PINCKNEY,
CHAS. H. SMITH.